(12) United States Patent
Wieloch et al.

(10) Patent No.: US 12,098,274 B2
(45) Date of Patent: Sep. 24, 2024

(54) POLYESTER PACKAGING MATERIAL (71) Applicant: Penn Color, Inc., Doylestown, PA (US)

(72) Inventors: Kelan Wieloch, Lansdale, PA (US); Venumadhava S. Eleswarapu, Doylestown, PA (US); Scott Stamback, Doylestown, PA (US); James C. Walsh, Doylestown, PA (US); Fred Biemuller, Doylestown, PA (US)

(73) Assignee: Penn Color, Inc., Doylestown, PA (US)

( * ) Notice: Subject to any disclaimer, the term of this patent is extended or adjusted under 35 U.S.C. 154(b) by 0 days.

(21) Appl. No.: 18/366,764

(22) Filed: Aug. 8, 2023

(65) Prior Publication Data
US 2023/0383117 A1 Nov. 30, 2023

Related U.S. Application Data (62) Division of application No. 16/957,275, filed as application No. PCT/US2018/067676 on Dec. 27, 2018, now Pat. No. 11,760,873.

(60) Provisional application No. 62/764,783, filed on Aug. 16, 2018, provisional application No. 62/611,713, filed on Dec. 29, 2017.

(51) Int. Cl.
C08L 67/02 (2006.01)
B32B 27/36 (2006.01)
B65D 81/30 (2006.01)
C08J 5/18 (2006.01)
C08L 67/04 (2006.01)

(52) U.S. Cl.
CPC .............. C08L 67/02 (2013.01); B65D 81/30 (2013.01); C08J 5/18 (2013.01); C08L 67/04 (2013.01); B32B 27/36 (2013.01); B32B 2307/4026 (2013.01); B32B 2439/70 (2013.01); C08J 2367/02 (2013.01); C08J 2367/04 (2013.01); C08J 2423/20 (2013.01); C08L 2203/16 (2013.01); C08L 2205/02 (2013.01)

(58) Field of Classification Search
None
See application file for complete search history.

(56) References Cited

U.S. PATENT DOCUMENTS

| 3,640,944 A | 2/1972 | Seppala et al. |
| 4,368,295 A | 1/1983 | Newton et al. |
| 4,377,616 A | 3/1983 | Ashcraft et al. |
| 5,089,309 A | 2/1992 | Odate et al. |
| 5,143,765 A | 9/1992 | Maier et al. |
| 5,208,277 A | 5/1993 | Boudreaux, Jr. |
| 5,407,745 A | 4/1995 | Bankar et al. |
| 5,534,593 A | 7/1996 | Friedman |
| 5,660,931 A | 8/1997 | Kim et al. |
| 6,326,431 B1 | 12/2001 | Peiffer et al. |
| 8,575,296 B2 | 11/2013 | Vernon et al. |
| 9,212,433 B2 | 12/2015 | Kano et al. |
| 9,994,383 B2 | 6/2018 | Leza Roa et al. |
| 10,259,939 B1 | 4/2019 | Wang |
| 2002/0160215 A1 | 10/2002 | Peiffer et al. |
| 2004/0086732 A1 | 5/2004 | Peiffer et al. |
| 2004/0266930 A1 | 12/2004 | Nishi et al. |
| 2006/0275592 A1 | 12/2006 | Tsuchida et al. |
| 2007/0004813 A1 | 1/2007 | Shelby et al. |
| 2007/0063394 A1 | 3/2007 | Lepage |
| 2009/0042016 A1 | 2/2009 | Yoshida |
| 2009/0169786 A1 | 7/2009 | Dierick |
| 2010/0202991 A1 | 8/2010 | Simon et al. |
| 2011/0045222 A1 | 2/2011 | Peters |
| 2011/0123789 A1 | 5/2011 | Feng et al. |
| 2011/0213101 A1 | 9/2011 | Shi |
| 2012/0165422 A1 | 6/2012 | Vernon et al. |
| 2013/0004760 A1 | 1/2013 | Pellingra |
| 2013/0222932 A1 | 8/2013 | Yoshida et al. |
| 2015/0041839 A1 | 2/2015 | Sakai |
| 2015/0056412 A1 | 2/2015 | Yu et al. |
| 2017/0133531 A1 | 5/2017 | Isobe |
| 2017/0306143 A1 | 10/2017 | Li |
| 2018/0179356 A1 | 6/2018 | Choi et al. |
| 2021/0139656 A1 | 5/2021 | Werink et al. |

FOREIGN PATENT DOCUMENTS

| CA | 3007223 A1 | 6/2017 |
| CN | 102575076 A | 7/2012 |
| EP | 0273681 A2 | 7/1988 |
| EP | 2024433 B1 | 2/2009 |
| EP | 2035209 A2 | 3/2009 |

(Continued)

OTHER PUBLICATIONS

V54B Cavitated Film May 2016 (Mitsubishi Polyester Film).
Special Effects in Plastics 2002, Rapra Technology Limited, Nov. 2002, Berlin, Germany.
Third Party Observation filed Apr. 1, 2021 in EP 18847288.0, 5 pp.
Third Party Observation filed Apr. 5, 2021 in EP 18847288.0, 8 pp.
Clarke et al., Journal of the Society of Dyers and Colourists 1984, 100, 128-132.
International Search Report and Written Opinion mailed Nov. 16, 2020 for PCT/US2020/047348, 9 pp.
CIELAB Color Scale, Insight on Color, HunterLab, Applications Note vol. 8, No. 7, 2008, 4 pp.

(Continued)

Primary Examiner — Robert T Butcher
(74) Attorney, Agent, or Firm — Fox Rothschild LLP (57) ABSTRACT White goniochromatic packaging material. The package wall containing a composition useful for blocking light in the spectrum ranges from about 200 nm to about 1200 nm. The composition has polyester, polymethylpentene, and a light scattering pigment. The composition optionally includes at least one other colorant. Each of the polymethylpentene and the light scattering pigment comprise about 0.1 to about 0.5 weight percent of the wall. The polyester and polymethylpentene are immiscible and when subjected to orientation stresses the composition produces a goniochromatic packaging article.

8 Claims, 2 Drawing Sheets

(56) References Cited

FOREIGN PATENT DOCUMENTS

| | | |
|---|---|---|
| EP | 2035209 B1 | 5/2016 |
| EP | 3339355 A1 | 6/2018 |
| GB | 1563591 A | 3/1980 |
| JP | H08277359 A | 10/1996 |
| JP | 2000202972 A | 7/2000 |
| JP | 2002098808 A | 4/2002 |
| JP | 2017030244 A | 2/2017 |
| JP | 2017030251 A | 2/2017 |
| WO | 2003/095564 A1 | 11/2003 |
| WO | 2004/095319 A2 | 11/2004 |
| WO | 2005/061596 A1 | 7/2005 |
| WO | 2005/105903 A2 | 11/2005 |
| WO | 2007/058506 A1 | 5/2007 |
| WO | 2008/116796 A1 | 10/2008 |
| WO | 2009/079724 A2 | 7/2009 |
| WO | 2011/040905 A1 | 4/2011 |
| WO | 2017/095931 A1 | 6/2017 |
| WO | 2018112036 A1 | 6/2018 |
| WO | 2019/084337 A1 | 5/2019 |
| WO | 2019/117725 A1 | 6/2019 |
| WO | 2019/133713 A1 | 7/2019 |
| WO | 2020/106156 A1 | 5/2020 |
| WO | 2020/251361 A1 | 12/2020 |

OTHER PUBLICATIONS

Franz et al., "Invesitgation of non-intentionally added substances (NIAS) in PET bottls and closures", Fraunhofer Institute for Process Engineering and Packaging (IVV), 2008, 1 p.
Declaration under 37 C.F.R. 1.132 of Kelan Wieloch dated Nov. 22, 2021.
Declaration under 37 C.F.R. 1.132 of Kelan Wieloch dated Nov. 8, 2022.
Declaration under 35 C.F.R. 1.132 for Dr. Loong-Tak Lim dated Jun. 16, 2022.

POLYESTER PACKAGING MATERIAL

CROSS-REFERENCE TO RELATED APPLICATIONS

This application is a divisional of U.S. patent application Ser. No. 16/957,275 filed Jun. 23, 2020, which is a National Stage Application under 35 U.S.C. § 371 of International Application No. PCT/US2018/067676 filed Dec. 27, 2018, which claims the benefit of priority to U.S. Provisional Patent Application No. 62/611,713 filed Dec. 29, 2017, and U.S. Provisional Patent Application No. 62/764,783 filed Aug. 16, 2018, the disclosures of all of which are hereby incorporated by reference in their entireties.

FIELD

The present invention relates to packaging. In particular, the invention relates to packaging with a high lightness value, high light blocking, a low percentage of additives, and a goniochromatic appearance (uniform color across all viewing angles).

BACKGROUND

In the field of packaging, plastic has taken the place of other materials such as glass. This substitution minimizes breakage, reduces weight, and reduces energy consumed in manufacturing and transport.

Attracting consumers to purchase individually-sized or family-sized containers includes branding and trade dress. Among the elements of valuable trade dress is the color of the container. Among the elements of valuable branding is consistent visibility of color. For certain products, such as milk, a light or bright white container is desired.

Figure 1:
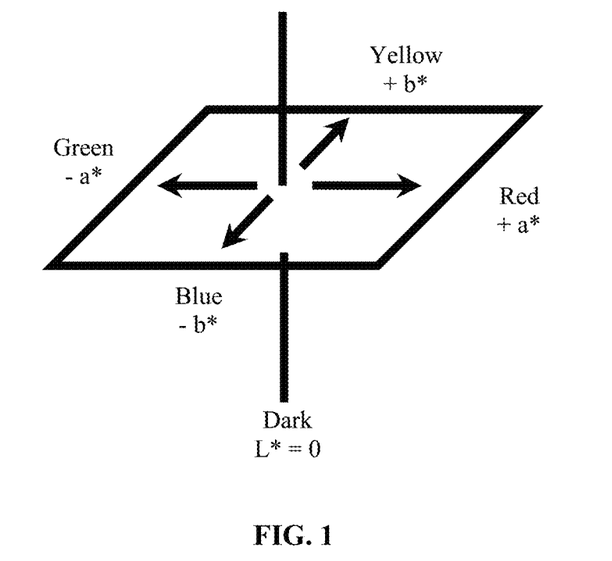
FIG. 1 is a diagram of the CIELAB L*, a*, b* color space.

Lightness can be defined within the CIELAB color space, which mathematically describes all perceivable colors in three dimensions: L* for lightness, a* for green-red, and b* for blue-yellow. FIG. 1 depicts the CIELAB color scale. In the CIELAB color space, the L* axis runs from top to bottom. The maximum for L* is 100, which would be a perfect reflecting diffuser (i.e., the brightest white). The minimum for L* would be 0 which would be a perfect absorber (i.e., the darkest black). Positive a* is red. Negative a* is green. Positive b* is yellow. Negative b* is blue.

One of the most important attributes of the CIELAB model is device independence. This means that the colors are defined independent of their nature of creation or the device they are displayed on. The L*-value of the CIELAB color scale can be obtained using any CIELAB color measurement instrument and is calculated using the formula:

$$L^* = 116 \cdot \sqrt[3]{\frac{Y}{Y_n}} - 16$$

Wherein Y is the CIE tristimulus value and $Y_n$ is the tristimulus value for the illuminant. The CIELAB model permits the quantification of how light a product actually is. Lightness is typically achieved by adding highly reflective and minimally absorbing components, for example titanium dioxide ($TiO_2$).

Goniochromatic packages maintain color and appearance across all viewing angles. Goniochromatic packages are beneficial for uniform color consistency and brand recognition regardless of the viewing position of a consumer. Conversely, gonioapparent packages show a color difference across viewing angles. Metallic or pearlescent effects are gonioapparent. While metallic or pearlescent effects can be eye catching, they can lead to reduced brand recognition and color non-uniformity.

Figure 3:
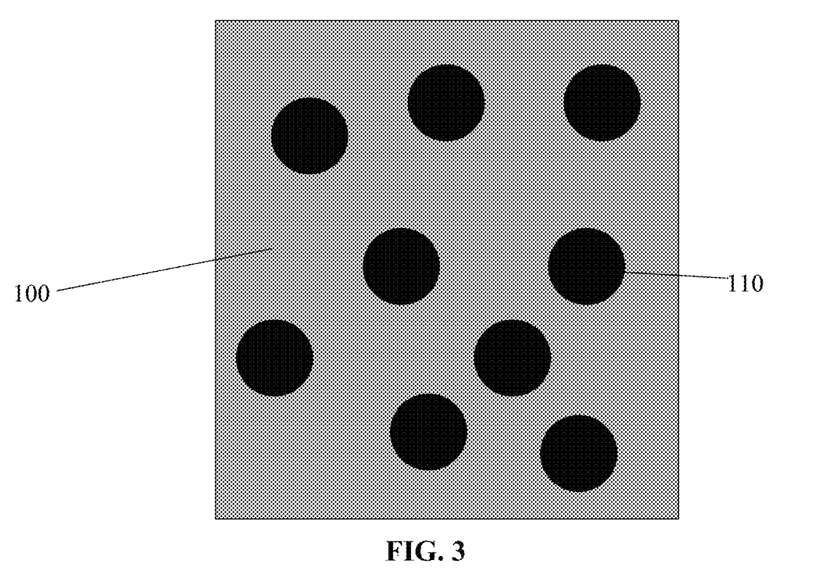
FIG. 3 is an exemplary embodiment of a mixture of immiscible polymers.
Figure 4:
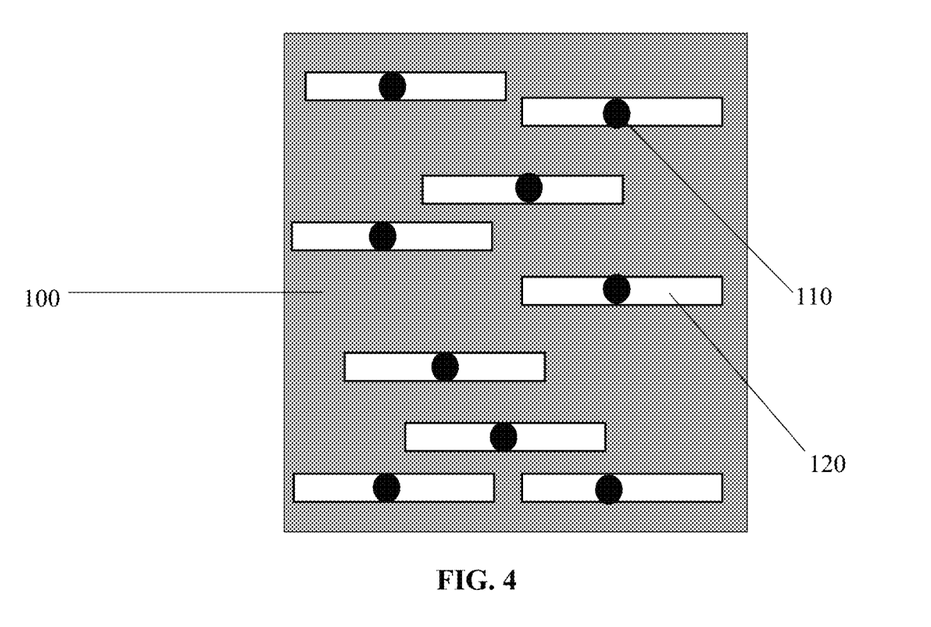
FIG. 4 is an exemplary embodiment of a mixture of immiscible polymers subject to orientation.

Phase-separated mixtures, as depicted in FIG. 3, result when one mixes immiscible polymers. However, when these phase-separate mixtures are subjected to orientation stress (e.g., blow molding, biaxial sheet orientation, monoaxial stretching, thermoforming, or fiber spinning), the spheres of the minor immiscible component flatten. The problem is such immiscible components may not entirely flatten leading to internal overlapping voids within the structural polymer, as depicted in FIG. 4. These voids create a multitude of light scattering surfaces that reflect light in a non-uniform manner resulting in a gonioapparent effect (i.e., pearlescent or metallic appearance) where the color difference across viewing angles changes by more than 10 units $DE_{CMC}$.

Figure 2:
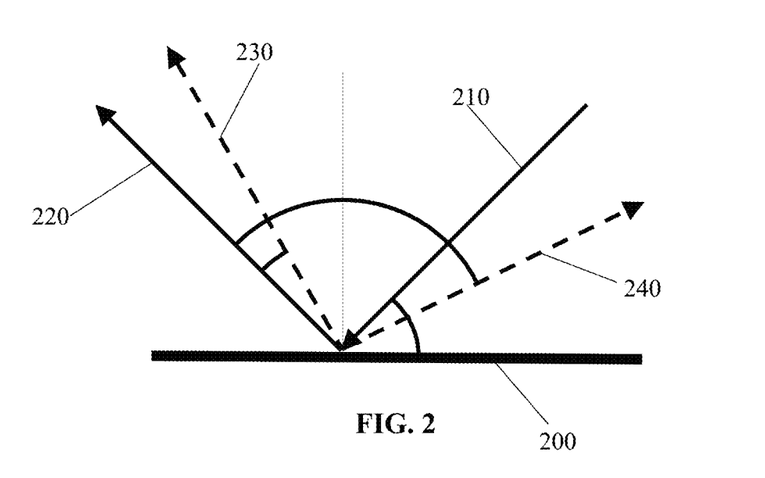
FIG. 2 is a diagram of gonioapparent color measurement.

Gonioappearance can be measured with a multi-angle spectrophotometer, such as an MA-T12 from X-Rite. ASTM E2175 describes the standard practice for specifying the geometry of multi-angle spectrophotometers. The color difference, as calculated using CIELAB $DE_{CMC}$, between near specular and far-specular viewing angles can be used to quantify the magnitude of the gonioappearance. Using a 45° incident light source and measuring color at near-specular (15°) and at far specular (110°), the color difference demonstrates the change in appearance over a range of viewing angles. FIG. 2 shows such a measurement for gonioappearance. For such a measurement a difference of more than 10 units $DE_{CMC}$ is significant and indicates gonioappearance. A difference of less than 10 units $DE_{CMC}$ is not significant and indicates a goniochromatic appearance.

Light barrier is also desired because there is a need to obscure the content of a package or to prevent quality degradation of the packaged product during the period of time between packaging and consumption. Light exposure can cause undesired changes to packaged goods. Preventing this degradation is difficult to accomplish when the product is sensitive to light radiation. In milk, for example, light has both deleterious photochemical and ionizing effects. Specifically, riboflavin photo-degrades when exposed to light between 200 nm and 520 nm. This degradation deleteriously affects the taste and odor of the milk.

A light barrier restricts certain wavelengths of light from passing through package walls. This can be achieved through reflection or absorption, which prevents deleterious effects to the contents held within the package. However, typical methods to achieve light barrier are associated with trade-offs in performance in other critical areas of the package.

A bright white color would reflect almost all light, thereby protecting the product from further degradation. Previously, to obtain a bright white container packagers would add colorants or opacifiers. Such additional colorants or opacifiers increased the cost of the container and can result in a swirled appearance (i.e., the colorant and/or opacifier would not appear to have fully dispersed within the composition), which may have a negative impact on the consumer's perception of the product. Opacifiers may also lead to reduced physical properties due to high pigment content, reduced ability to recycle, and lower gloss. For PET blow molded bottles or thermoformed parts, high levels of opacifiers leads to difficulty reheating preforms due to the high reflectivity of infrared light.

To overcome high reflectivity, absorbing pigments and/or dyes are commonly used to increase light barrier and reduce the total colorant content. However, adding absorbing pigments also reduces the lightness of a package. Creating a lighter package with high light barrier has, to date, required sacrificing either lightness, light barrier, or high loading levels (affecting cost, physical properties, gloss, recyclability).

U.S. Pat. No. 4,377,616 describes lustrous satin appearing, opaque film compositions and method of preparing same. U.S. Pat. No. 5,089,309 describes a semitransparent resin container with pearly luster. U.S. Pat. No. 4,368,295 describes films from compositions of polyesters and olefin polymers. U.S. Pat. No. 3,640,944 describes modified polyester film for punched tapes. U.S. Pat. No. 8,575,296 describes polyester articles having simulated metallic or pearlescent appearance. EP 2035209B1 discloses a preform and container for radiosensitive products and method for manufacture thereof. U.S. Publication No. 2017/0306143A1 discloses a light barrier composition and articles comprising same.

The references identified above all disclose articles with a pearlescent appearance, also described as lustrous, nacreous, or metallic, which is not desirable. Furthermore, these references evidence that the use of incompatible polymers such as polypropylene must be used at high loading levels greater than 5% and do not have a synergistic effect when used in combination with a light scattering pigment. In summary, such references do not disclose how to create a goniochromatic appearance with a constant color across a wide range of viewing angles and synergistically improves light barrier, by allowing for a reduced loading of additives, higher $L^*$, and a brighter, whiter appearance with low loading levels of incompatible polymers.

Thus, there is a need for a low cost, goniochromatic composition produced from immiscible polymers. It is desirable that the composition have anti-swirl behavior that provides whiteness and lightness without the typical trade-offs in light barrier, or any other properties such as physical properties, recyclability, gloss or ability to reheat.

SUMMARY

White articles made with phase separated materials are known to have a nacreous or pearlescent effect (i.e., a gonioapparent appearance). It has been discovered that using polymethylpentene and a light scattering pigment has an unexpected synergistic effect, even at very low addition levels for such components and creates a package wall with a goniochromatic appearance and excellent light blocking properties.

Such a wall includes a polyester combined with an oriented polymethylpentene and a light scattering pigment. About 0.1 to about 5.0 percent of the weight of the wall is polymethylpentene and about 0.1 to about 5.0 percent of the weight of the wall is a light scattering pigment. The ratio of polymethylpentene to light scattering pigment in the wall is from about 5:1 to about 1:5. Furthermore, the wall is goniochromatic.

Combining a light scattering pigment with polymethylpentene synergistically increases light reflection, which consequently enhances the light barrier. Since the synergistic increase in light reflection does not occur until after orientation (e.g., blow molding), the $L^*$ and whiteness index may be lower prior to orientation. Because of the reduced amount of colorants and/or opacifiers, the composition exhibits anti-swirl behavior as a lower concentration may be easier to disperse. As a result, the disclosed composition provides a low cost composition with anti-swirl behavior that requires little to no opacifiers or colorants to produce a bright white goniochromatic package.

Without a light scattering pigment, a package with elongated plate-like light scattering surfaces will have a gonio-apparent appearance, showing a large color change across a range of viewing angles and may be unrecognizable depending on the lighting conditions and viewer position. Adding a light scattering pigment to the structural polymer (e.g., polyester) and polymethylpentene composition surprisingly eliminates the gonioappearance with just a small amount of a light scattering pigment, as low as 0.1%.

In certain embodiments of the invention, the light scattering pigment is selected from the group consisting of aluminum trihydrate ($Al(OH)_3$), titanium dioxide ($TiO_2$), barium sulfate ($BaSO_4$), zinc sulfide (ZnS), mica, ultramarine blue (PB 29), metal oxide particles such as pigment yellow 53 (PY 53), red iron oxide (PR 101), black iron oxide (PBlk 11), Chromium Green-Black Hematite (PG 17), cobalt aluminate (PB 28), and combinations thereof.

Another effect of the reduced amount of pigments or colorants is better physical properties. Colorants and/or opacifiers can contribute to polymer degradation by bringing moisture and increasing shear stress in polymer processing. Additives also reduce the total amount of structural polymer that can contribute to physical properties. Degraded polymer can result in decreased physical properties such as top load, tensile strength, or environmental stress cracking.

Another effect of the reduced amount of colorants and/or opacifiers is improved reheat performance. Colorants and/or opacifiers that typically employed to create white packages reflect light, including IR light often used to reheat packaging materials for thermoforming or bottle blowing. With less IR reflected light, a structural polymer will absorb more efficiently and reheat more uniformly. Since polymethylpentene creates reflection after orientation, the color and appearance of an oriented sample will be different than a non-oriented (i.e., amorphous) sample.

Another effect of the reduced amount of colorants and/or opacifiers is improved or maintained gloss. Colorants and opacifiers can impact surface smoothness when used at very high loadings, resulting in a less glossy appearance. Reducing the amount of colorants maintains surface smoothness and a highly glossy appearance.

Another effect of the reduced amount of colorants and/or opacifiers is improved recyclability. Colorants and/or opacifiers can be considered contaminants in the recycle stream. Since the polymethylpentene does not show strong reflectivity until after orientation, recycling into a non-oriented article has less impact on the recyclability than other pigments and/or colorants.

In certain embodiments of the present invention, the package wall may contain a second pigment or a colorant, separate from the light scattering pigment, wherein the second pigment is selected from the group consisting of: dyes, pigments, thermochromic pigments, fluorescent pigments, pearlescent pigments, and metallic pigments, or a combination thereof.

In certain embodiments of the present invention, the gonioappearance of the wall is less than 10 units, measured as $DE_{CMC}$ with a 45° incident light source between 15° near-specular reflection and 110° far specular reflection.

In certain embodiments of the present invention, the polyester is selected from the group consisting of: polyethylene terephthalate (PET), copolymers of PET, polybutylene terephthalate (PBT), copolymers of PBT, polylactic acid (PLA), poly trimethylene terephthalate (PTT), polyethylene naphthalate (PEN), polyethlene furanoate (PEF), polycyclohexylene dimethylene terephalate (PCT), copolymers of PCT, sulfonated polyesters, copolymers of polyesters, polycaprolactone (PCL), polyhydroxyalkanoate (PHA), and copolymers of PHA.

In certain embodiments of the present invention, polymethylpentene makes up: about 0.1 to about 3.0, about 0.2 to about 2.0, or about 0.2 to about 4.0 percent of the weight of the wall.

In certain embodiments of the present invention, the ratio of polymethylpentene to light scattering pigment in the package wall is from: about 4:1 to about 1:4, or about 3:1 to about 1:3.

In certain embodiments of the present invention, the light scattering pigment is titanium dioxide ($TiO_2$).

In certain embodiments of the present invention, the wall has a light barrier for light with wavelengths ranging from about 200 nm to about 1200 nm of greater than: about 90, about 95, about 98, about 99, or about 99.5 percent. In other embodiments, the wall has a light barrier for light with wavelengths ranging from about 400 nm to about 700 nm, of greater than: about 90, about 95, about 98, about 99, or about 99.5 percent In certain embodiments of the present invention the L* value of the wall according to CIELAB color space is greater than: about 75, about 80, or about 85.

In certain embodiments of the present invention, the wall is a mono-layer container wall. In other embodiments the wall is a multi-layer container wall wherein at least one layer includes a polyester an oriented polymethylpentene and a light scattering pigment.

In certain embodiments, additional (i.e., a separate component from the light-scattering pigment) colorants are added to the wall including: dyes, special effects pigments, or other additives such as UV absorbers, anti-oxidant stabilizers, dispersants, waxes, slip additives, other polymers, or other components such as, for example, thermochromic pigments, fluorescent pigments, pearlescent pigments, and metallic pigments.

In certain embodiments of the present invention, the polymethylpentene is oriented by injection stretch blow molding, extrusion blow molding, film or sheet uniaxial or biaxial orientation, blown film, thermoforming or fiber spinning. There are no specific limits on orientation. In general, higher orientation leads to higher reflecting surfaces and higher light blocking.

Finally, a method of producing the package wall is disclosed whereby a polyester, a polymethylpentene, and a light scattering pigment are combined to produce a mixture having about 0.1 to about 5.0 weight percent of polymethylpentene and about 0.1 to about 5.0 weight percent of the light scattering pigment. Furthermore, the ratio of polymethylpentene to light scattering pigment is from about 5:1 to about 1:5. The wall is then produced by subjecting the mixture to orientation stress thereby orienting the structural polymer.

In certain embodiments, the density of the mixture prior to being subject to the orientation stress is equal to or lower than that of the polyester. In other embodiments, the density of the wall after being subject to the orientation stress is equal to or lower than that of the polyester.

In a non-limiting embodiment, a product may be added to a container with walls having an oriented polyester, polymethylpentene, and a light scattering pigment and optionally another pigment and/or a colorant. The container may then be sealed.

It is to be understood that both the foregoing general description and the following detailed description are exemplary, but are not restrictive, of the invention.

DETAILED DESCRIPTION

Embodiments disclosed herein include compositions that are useful in the manufacture of bright white packaging. Embodiments include a package wall comprising, consisting essentially of, or consisting of: a polyester; from about 0.1 to about 5.0 weight percent polymethylpentene; and from about 0.1 to about 5.0 weight percent light scattering pigment, wherein the ratio of polymethylpentene to light scattering pigment is from about 5:1 to about 1:5, and the wall is goniochromatic. Once subject to biaxial orientation stress (e.g., blow molding) the package wall is bright white, having an L*-value according to the CIELAB color scale of greater than about 75. Furthermore, in some embodiments, the composition has a light barrier of greater than 90 percent for light within the wavelength of between about 200 nm to about 1200 nm.

Polyester Structural Polymer

As used herein, the term "structural polymer" refers to a polymeric material comprising a majority of the composition and which provides the majority of the mechanical properties to an article such as, for example, a plastic container. Preferably, the structural polymer is a polyester polymer. The structural polymer is referred to as reference No. 100 in FIGS. 3 and 4.

Any polyester is a candidate for use in the present invention. The formation of a polyester from a monool or a polyol and an acid or its ester encompasses many different suitable types of polyesters for use in this invention. The monomeric units can be formed reactions of either aliphatic moieties, aromatic moieties, or both. Desirably, the polyester is transparent or semitransparent.

Non-limiting examples of polyesters include terephthalates, terephthalate glycols, lactides, (hydroxy)alkanoates, copolyesters of terephthalic acid residues, 2,2,4,4-tetramethyl-1,3-cyclobutanediol, and 1,4-cyclohexanedimethanol, etc., or combinations thereof.

Additionally, one can use homopolyesters or copolyesters, such as homopolymers and copolymers of terephthalic acid and isophthalic acid. The linear polyesters may be produced by condensing one or more dicarboxylic acids or a lower alkyl diester thereof, e.g., dimethylterephthalate, terephthalic acid, isophthalic acid, phthalic acid, 2,5-, 2,6-, or 2,7-naphthalene dicarboxylic acid, succinic acid, sebacic acid, adipic acid, azelaic acid, bibenzoic acid and hexahydroterephthalic acid, or bis-p-carboxyphenoxyethane, with one or more glycols, e.g., ethylene glycol, pentyl glycol, and 1,4-cyclohexanedimethanol.

Of these various polyester candidates, because of commercial availability, the terephthalates, such as polyethylene terephthalate (PET) or polybutylene terephthalate (PBT), the lactides, such as polylactic acid (PLA), and the hydroxyalkanoates, such as polyhydroxybutyrate (PHB) or polyhydroxybutyrate-co-valerate (PHBV), are desirable for use.

PET is preferred because of its ubiquity and cost, although PLA and PHBV are emerging as bio-derived thermoplastic polyesters which can supplant PET in some situations. In some embodiments, PET may be blended with other polyesters.

Polymethylpentene

As used herein "polymethylpentene" refers to a thermoplastic homopolymer or copolymer consisting primarily of 4-methyl-1-pentene units. Polymethylpentene may include copolymers with 1-decene, 1-hexadecene, 1-octadecene, or combinations thereof. Referring to FIGS. 3 and 4, polymethylpentene is referred to as reference No. 110 and is incompatible with the polyester structural polymer 100 and constitutes a minor, dispersed phase. In a non-limiting embodiment, polymethylpentene 110 is present at from about 0.1 weight percent and about 5.0 weight percent of the composition.

When present in a wall for a package, polymethylpentene 110 is present at from about 0.1 weight percent and about 5.0 weight percent, or from about 0.1 to about 3.0 weight percent, or from about 0.2 to about 2.0 weight percent, or from about 0.2 to about 4.0 weight percent, or from about 0.1 to about 0.5 weight percent, or from about 0.1 to about 0.7 weight percent, or from about 0.1 to about 1.0 weight percent, or from about 0.5 to about 2.0 weight percent, of the weight of the wall.

With reference to FIGS. 3 and 4 and without being bound by any particular theory, it is believed that when a structural polymer 100 with a dispersed phases of polymethylpentene 110 is subjected to orienting stress (e.g., blow molding), the rigidity and surface tension of the polymethylpentene 110 allows the structural polymer 100 to flow around the polymethylpentene 110. Polymethylpentene 110 maintains its shape, within a reasonable degree of tolerance, resulting in the formation of voids 120 within the structural polymer 100. Light scattering pigments, disperse within the structural polymer 100, even though they may have at one time been dispersed in polymethylpentene 110. The light scattering pigments scatter light over a range of directions and disrupt the gonioapparent appearance from the voids 120 to create a goniochromatic appearance. Thus, polymethylpentene 110, when combined with light scattering pigments in a composition employed to form a container by an orientation process (e.g., blow molding) imparts a goniochromatic appearance to a container wall once oriented.

In some embodiments, compositions and package walls disclosed herein are free of polypropylene.

Light Scattering Pigment

As used herein "light scattering pigment" refers to any inclusion within the structural polymer 100 or within the immiscible polymer that interacts with incident light by primarily diffracting light and optionally scattering and/or absorbing. Diffraction occurs as a result of a difference in refractive index between the light scattering pigment and the immiscible polymer or the structural polymer 100. Light scattering pigments may solely diffract, as in the case of titanium dioxide ($TiO_2$), or they may both scatter and absorb, as in the case of black iron oxide (PBlk 11). Some examples of light scattering pigments include titanium dioxide ($TiO_2$), ultramarine blue (PB 29), metal oxide particles such as red iron oxide (PR 101), black iron oxide (PBlk 11), chromium green-black hematite (PG 17), or cobalt aluminate (PB 28), aluminum trihydrate ($Al(OH)_3$), barium sulfate ($BaSO_4$), zinc sulfide (ZnS), or mica.

When present in a wall for a package, light scattering pigment is present at from about 0.1 weight percent and about 5.0 weight percent, or from about 0.1 weight percent and about 4.0 weight percent or from about 0.1 to about 3.0 weight percent, or from about 0.2 to about 2.0 weight percent, or from about 0.2 to about 4.0 weight percent, or from about 0.1 to about 0.5 weight percent, or from about 0.1 to about 0.7 weight percent, or from about 0.1 to about 1.0 weight percent, or from about 0.5 to about 2.0 weight percent, of the weight of the wall.

Furthermore, the ratio of polymethylpentene to light scattering pigment by weight of the wall is from about 5:1 to about 1:5, or from about 4:1 to about 1:4, or from about 3:1 to about 1:3, or from about 2.5:1 to about 1:2.5, or from about 2:1 to about 1:2, or from about 1.5:1 to about 1:1.5, or from about 1.25:1 to about 1:1.25, or from about 0.75:1 to about 3:1, or from about 0.5:1 to about 3:1, from about 0.75:1 to about 2:1, or from about 0.5:1 to about 2:1.

Gonioappearance

Gonioappearance of a surface 200 can be measured with a multi-angle spectrophotometer, such as an MA-T12 from X-Rite. The color difference from an original light source 210, as calculated using CIELAB $DE_{CMC}$, between an initial specular viewing angle 220, a near-specular viewing angle 230, and a far-specular viewing angle 240 may be used to quantify the magnitude of the gonioappearance. The original light source 210 may approach the surface 200 at any desired angle. For example, as depicted in FIG. 2, the light source 210 may approach the surface at about a 45 degrees angle of incidence. Furthermore, the near specular viewing angle 230 forms an angle with the initial specular viewing angle 220 that is less than the angle formed by the far specular viewing angle 240 and the initial specular viewing angle 220. For example, as depicted in FIG. 2, the near specular viewing angle 230 may be 15 degrees and the far specular viewing angle 240 may be 110 degrees.

Colorant

The instant compositions optionally includes at least one colorant. The colorant may absorb a first range of light wavelengths, contained within a spectrum of light wavelengths between about 200 nm and about 1200 nm. Suitable colorants include any of the organic dyes, organic pigments, inorganic dyes and inorganic pigments that are typically used as colorants in polymer applications. Examples of such colorants include the following colorants of respective colors to be shown below. In the following, the designation "C. I." means color index.

A black colorant includes, for example, carbon black, copper oxide, manganese dioxide, aniline black, activated carbon, non-magnetic ferrite, magnetic ferrite, and magnetite.

A yellow pigment includes, for example, C.I. pigment yellow 13, C. I. pigment yellow 14, C. I. pigment yellow 17, C. I. pigment yellow 74, C. I. pigment yellow 93, C. I. pigment yellow 155, C. I. pigment yellow 180, and C. I. pigment yellow 185.

An orange colorant includes, for example, red chrome yellow, molybdenum orange, permanent orange GTR, pyrazolone orange, vulcan orange, indathrene brilliant orange RK, benzidine orange G, indathrene brilliant orange GK, C.I. pigment orange 31, C. I. pigment orange 43.

A red colorant includes, for example, C.I. pigment red 52, C.I. pigment red 53, C. I. pigment red 19, C.I. pigment red 48:1, C.I. pigment red 48:2, C. I. pigment red 48:3, C. I. pigment red 57:1, C. I. pigment red 122, C. I. pigment red 150, and C. I. pigment red 184.

A purple colorant includes, for example, C.I. pigment violet 23, manganese purple, fast violet B, and methyl violet lake.

A blue colorant includes, for example, C. I. pigment blue 15, C. I. pigment blue 15:2, C. I. pigment blue 15:3, C.I. pigment blue 15:4, C. I. pigment blue 16, and C. I. pigment blue 60.

A green colorant includes, for example, chromium green, chromium oxide, pigment green B, micalite green lake, final yellow green G, and C. I. pigment green 7.

A white colorant includes compound, for example, zinc powder, titanium oxide, antimony white, and zinc sulfide.

The colorant may include non-traditional pigments. Examples of such non-traditional also referred to as "effect pigments" are: thermochromic pigments, fluorescent pigments, pearlescent pigments, metallic pigments, and combinations thereof. Such "effect pigments" are separate compounds relative to the light-scattering pigment.

The colorants can be used each alone or two or more of them of different colors can be used together. A plurality of colorants of an identical color system can also be used together. The ratio of the optional colorant to the structural polymer 100 is not particularly restricted and can be properly selected within a wide range in accordance with various conditions such as the type of structural polymer 100 or the characteristics required for the desired color to be achieved. As an example, the ratio of the colorant used to the structural polymer 100 can be preferably from 0.0001 part by weight or 5 parts by weight or less, and more preferably, 0.0004 parts by weight or more and 5 parts by weight or less based on 100 parts by weight of the structural polymer 100.

L* Value

On the CIELAB L*, a*, b* color space an L* value of greater than about 80 appears bright. In the present invention, the L* value of the composition after orientation may be from about: 70, 75, 80, 85, 90, 95, or 97 to 99.5, which is typically the maximum. Prior to orientation of the polymethylpentene, the L* value may have a lower range. In preferred embodiments, walls for packages that are white have an L* value greater than 80 or greater than 85 or greater than 90 or greater than 95.

Light Barrier

Light barrier is a quality characterizing the prevention of light from traveling through a sample over a range of light wavelengths. Light barrier can be measured as the average amount of light prevented from passing through a sample from 400 nm to 700 nm. Light barrier can also be measured as optical density. Optical density is $-\log_{10}$ of the ratio of light passing through a sample. This is beneficial for measuring samples with very high light barrier. For example, an optical density of 3 means that 99.9% of the light is prevented from passing through. In the present invention, the wall may prevent about: 75%, 80%, 85%, 90%, 95%, 97%, 98%, 99%, or 99.5% to 100% of the light from passing through the wall.

Spectrum of Light Wavelengths

The relevant light spectrum that the disclosed container blocks is not restricted to the visible light spectrum. Indeed, light within the ultraviolet spectrum and infrared spectrum can cause undesired changes to products. In non-limiting examples the spectrum of light wavelengths blocked by the combination of the structural polymer 100 and polymethylpentene, the light scattering pigment and/or the colorant includes: from about 200 nm to about 1200 nm; from about 250 nm to about 1000 nm; from about 300 nm to about 900 nm; from about 350 nm to about 800 nm; from about 400 nm to about 700 nm; from about 350 nm to about 600 nm; and from 350 nm to 550 nm.

Barrier Properties

Packaging may provide other barrier properties to, for example, moisture, oxygen, microbes, grease, or carbon dioxide. Indeed, in certain embodiments, the package wall may include oxygen scavengers. Examples of such oxygen scavengers are: polybutadiene-PET block copolymers with transition metal salts used as a catalyst; polyalkylene glycols, their copolymers, and blends thereof; and copolyetheresters.

Density

Polymethylpentene has a particular advantage of having a low density. Low density reduces overall part weight and leads to cost savings. For example, polymethylpentene has a density of 0.83 g/cm$^3$, whereas polyester terephthalate has a density of 1.39 g/cm$^3$. By incorporating 5 parts polymethylpentene with 100 parts polyester terephthalate, for example, the composite density is reduced by 3.1%. Since many plastic articles are made to a specific volume, this results in a lower article weight and less polymer consumption. Light scattering pigments like $TiO_2$, $BaSO_4$, or $ZnS$ have very high density, which when incorporated into a structural polymer can lead to increased article weight. For example, incorporating 5 parts $TiO_2$, the composite density increases by 3.2%. Using instead, a combination of 5 parts polymethylpentene and 5 parts $TiO_2$, the total weight of, for example, a container is equivalent to that of a PET container.

Packaging Articles

The white, light-blocking compositions disclosed herein can be employed to make packaging articles having various forms. Suitable articles include, but are not limited to, flexible sheet films, flexible bags, pouches, semi-rigid and rigid containers such as bottles (e.g., PET bottles), trays, and containers.

Typical flexible films and bags include those used to package various food items and may be made up of one or a multiplicity of layers to form the overall film or bag-like packaging material. The white light-blocking composition of the present invention can be used in one, some or all of the layers of such packaging material.

Typical rigid or semi-rigid articles include plastic, paper or cardboard containers, such as those utilized for milk, juices, soft drinks, alcohol as well as thermoformed trays or cups normally having a thickness in the range of from about 100 μm to about 1000 μm. The walls of such articles can comprise single or multiple layers of materials. The articles can also take the form of a bottle or can, or a crown, cap, crown or cap liner, plastisol or gasket. The white light-blocking composition of the present invention can be used as an integral layer or portion of, or as an external or internal coating or liner of, the formed semi-rigid or rigid packaging article. As a liner, the white light-blocking composition can be extruded as a film along with the rigid article itself, in, e.g., a co-extrusion, extrusion coating, or extrusion lamination process, so as to form the liner in situ during article production; or alternatively can be adhered by heat and/or pressure, by adhesive, or by any other suitable method to an outer surface of the article after the article has been produced.

In one non-limiting embodiment a container includes a bottom connected to a side wall, defining an interior space. The container may be formed of the white light-blocking composition. In such an embodiment, the container may also include a top containing an opening connected to the side wall with optionally a seal for opening. A light sensitive product, for example a food product such as milk, may be placed within the interior space. The white light-blocking composition may enclose all or part of the container or be restricted to just the opening. Finally, the container may be oxygen-resistant.

In one non-limiting embodiment of the present invention, the composition of the present invention, (e.g., a structural polymer base, polymethylpentene, and a light scattering pigment, and optionally another pigment and/or a colorant) can be employed to form a monolayer bottle. In another non-limiting embodiment of the present invention, the composition of the present invention can form one or more layers of a multilayer bottle.

Besides articles applicable for packaging food and beverage, articles for packaging other products can also benefit from the present invention. Such products would include pharmaceuticals, light sensitive medical products, audio/visual film and the like. Product labelling purposes may also require the package be a bright white color so that specific trade dress may be printed on the container.

Article Walls

In some embodiments, the invention concerns use of the compositions described herein as a component of a wall that is used in a desired white package for light sensitive materials.

The wall may be a rigid one, a flexible sheet, or a clinging film. It may be homogenous or a laminate or coated with other polymers. If it is laminated or coated, then the white color and light blocking property may reside in a layer of the wall which alone would not perform satisfactorily (e.g., not be bright white enough). However, if the layer is combined with other white layers which block light the article may perform satisfactorily (e.g., appearing bright white and blocking light).

The package walls of the instant invention can be a single layer or a multilayer construction. In some embodiments using multilayer walls, the outer and inner layers may be structural layers with one or more protective layers containing the structural and polymethylpentene there between. In some embodiments, the outer and inner layers comprise a polyolefin, a polyester, or nylon. In certain embodiments, a single layer design is preferred. Such a layer may have advantages in simplicity of manufacture and cost.

Method of Manufacture

The instant compositions can be made by mixing a polyester structural polymer (PET, for example) with polymethylpentene, a light scattering pigment, and optionally another pigment and/or colorant. Such compositions can be made by any method known to those skilled in the art. In certain embodiments, some or part of the light scattering pigment and/or colorant may exist in the base structural polymer or in polymethylpentene prior to mixing. This residual opacifier or colorant, for example, can exist as a result of a reclamation process (i.e., recycling). In some embodiments, structural polymer, polymethylpentene, light scattering pigment, and optional other pigment and/or colorant are mixed by tumbling in a hopper. Other optional ingredients can be added during this mixing process or added to the mixture after the aforementioned mixing or to an individual component prior to the aforementioned mixing step.

The instant composition can also be made by adding each ingredient separately and mixing the ingredients prior to melt processing the composition to form an article. In some embodiments, the mixing can be just prior to the melt process zone. In other embodiments, one or more ingredients can be premixed in a separate step prior to bringing all of the ingredients together.

The instant composition may also be produced by melt kneading. In such a non-limiting embodiment, the polyester structural polymer, polymethylpentene, light scattering pigment and optional colorant (and other components if present) are melt-kneaded to prepare a kneaded resin product. The melt kneading is conducted substantially without the use of an organic solvent, however, small amounts of an organic liquid (including an organic solvent) may be present as a process aid to, for example, control dusting of the polymer. The kneaded polymer composition may optionally contain additives, for example, a releasing agent such as wax and an additive such as a charge controller. The additives are kneaded together with the polyester structural polymer, polymethylpentene, light scattering pigment, and optional colorant and dispersed in the kneaded polymer composition.

In another aspect, the invention provides a package, whether rigid, semi-rigid, collapsible, lidded, or flexible or a combination of these, comprising a wall as formed from the compositions described herein. Such packages can be formed by methods well known to those skilled in the art.

Among the techniques that may be used to make articles are molding generally, stretch blow molding, extrusion, thermoforming, extrusion blow molding, biaxial orientation, and (specifically for multilayer structures) co-extrusion and lamination using adhesive tie layers. Orientation, e.g., by stretch blow molding, of the polymer is especially attractive with polyesters because of the known mechanical advantages that result.

The melt processing zone for making the article can be operated under customary conditions effective for making the intended articles, such as preforms, bottles, trays, and other articles mentioned below. In one embodiment, such conditions are effective to process the melt without substantially increasing the IV of the melt and which are ineffective to promote transesterification reactions. In some preferred embodiments, suitable operating conditions effective to establish a physical blend of the structural polymer, polymethylpentene, light scattering pigment and colorant are temperatures in the melt processing zone within a range of about 200° C. to about 300° C. at a total cycle time of less than about 6 minutes, and typically without the application of vacuum and under a positive pressure ranging from about 0 psig to about 900 psig. In some embodiments, the residence time of the melt on the screw can range from about 1 to about 4 minutes.

Specific articles include preforms, trays, containers, and rigid packages for the packaging of food, beverages, cosmetics, pharmaceuticals, and personal care products where a bright white package is desired and light blocking is needed. Examples of beverage containers are bottles for holding beer and juice, and the invention is particularly useful in bottle applications containing milk or any other beverage where the package is desired to be a bright white and light detrimentally affects the flavor, fragrance, performance (prevent vitamin degradation), or color of the drink. Rigid packages include food trays and lids. Examples of food tray applications include dual ovenable food trays, or cold storage food trays, both in the base container and in the lidding (whether a thermoformed lid or a film), where the freshness of the food contents can decay when exposed to light. The compositions of the instant invention also find use in the manufacture of containers for pharmaceuticals or medical devices.

Master Batch

In another aspect, the instant composition can be used as a master batch for blending with a polymer or a polymer containing component. In such compositions, the concentration of, for example, the polymethylpentene, light scattering pigment, and optionally another pigment and/or a colorant will be higher to allow for the final blended product to have suitable amounts of these components. The master batch may also contain an amount of the polyester structural polymer with which the master batch is to be blended. In other embodiments, the master batch may contain a polyester structural polymer that is compatible with a second structural polymer to which the master batch is to be blended. In other embodiments, the mater batch may contain polymethylpentene and a second functional polymer, one or both of which may be incompatible with the structural polymer.

Definitions

In this specification and in the claims that follow, reference will be made to a number of terms, which shall be defined to have the following meanings.

As used herein, the terms "a", "an", "the" and the like refer to both the singular and plural unless the context clearly indicates otherwise. "A bottle", for example, refers to a single bottle or more than one bottle.

Also as used herein, the description of one or more method steps does not preclude the presence of additional method steps before or after the combined recited steps. Additional steps may also be intervening steps to those described. In addition, it is understood that the lettering of process steps or ingredients is a convenient means for identifying discrete activities or ingredients and the recited lettering can be arranged in any sequence.

Where a range of numbers is presented in the application, it is understood that the range includes all integers and fractions thereof between the stated range limits. A range of numbers expressly includes numbers less than the stated endpoints and those in-between the stated range. A range of from 1-3, for example, includes the integers one, two, and three as well as any fractions that reside between these integers.

As used herein, "master batch" refers to a mixture of polymethylpentene, light scattering pigment, and optional colorant and optional structural polymer, and optional other polymer and optional other additives that will be diluted, typically with at least additional structural polymer, prior to forming an article. As such, the concentrations of polymethylpentene, light scattering pigment and/or colorant are higher than in the formed article.

The following examples are included to demonstrate preferred embodiments of the invention regarding the usefulness of PET base resin blended with polymethylpentene and a light scattering pigment to make bright white packages. It should be appreciated by those of skill in the art that the techniques disclosed in the examples which follow represent techniques discovered by the inventors to function well in the practice of the invention, and thus can be considered to constitute modes for its practice. However, those of skill in the art should, in light of the present disclosure, appreciate that many changes can be made in the specific embodiments which are disclosed and still obtain a like or similar result without departing from the spirit and scope of the invention.

EXAMPLES

The following materials are referenced in Table 1 below:
PMP—polymethylpentene, grade RT-31 from Mitsui Chemicals America, Inc. Counter Example 5 and Example 6 used grade was RT-18 from Mitsui Chemicals America, Inc.
PET—polyethylene terephthalate, grade PQB-4 from Polyquest, Inc. 0.80 IV bottle grade polymer.
PETG—glycol modified co-polyester, grade Skygreen K2012 from SK Chemicals.
$TiO_2$—titanium dioxide, light scattering pigment, CI Pigment White 6, grade CR-834 from Tronox Limited, general purpose rutile grade.
PPRO—polypropylene, grade Primaflex® HP 3500 from Plastics Solutions, Inc. 35 melt flow homopolymer.
ZnS—Zinc sulfide, light scattering pigment, CI Pigment White 7, grade Sachtloth HD-S from Venator.
PBlk 7—carbon black, Black Pearls 4350 from Cabot.
PBlk 11—Black iron oxide, CI Pigment Black 11, grade Bayferrox 318M from Lanxess.
SB 104—CI Solvent Blue 104, non-light scattering colorant, grade Keyplast Blue KR from Milliken.
$TiO_2$ MB—65% $TiO_2$ and 35% PET were extruded in a 25 mm corotating twin screw extruder at 300 RPM and 250° C. and chopped into pellets.
ZnS MB—50% ZnS and 50% PET were extruded in a 25 mm corotating twin screw extruder at 300 RPM and 250° C. and chopped into pellets.
SB 104 MB—10% SB 104 and 89.3% PETG, 0.5% epoxidized soybean oil, and 0.2% BNX 1010 antioxidant stabilizer grade were extruded in a 25 mm corotating twin screw extruder at 300 RPM and 250° C. and chopped into pellets.

Examples 6, 7a, 7b, 7c, 7d, 8a, 8b, 8c, 9 and 10 all utilized a pre-made master batch. The composition of each master batch is listed in Table 1. All master batch compositions were extruded in a 25 mm corotating twin screw extruder at 300 RPM and chopped into pellets. Each master batch was added to the feed throat of the extrusion step of a blow molding process at the amount shown in Table 1 below:

TABLE 1

Masterbatch samples used in examples and counter examples

|  | PPRO | PMP | $TiO_2$ | ZnS | PBlk 7 | PBlk 11 | PET | PETG | Dosage |
|---|---|---|---|---|---|---|---|---|---|
| Ex 6 MB |  | 50.00% |  | 50.00% |  |  |  |  | 5.00% |
| Ex 7a MB |  | 99.01% |  |  |  | 0.99% |  |  | 6.06% |
| Ex 7b MB |  |  | 65.00% |  |  | 0.50% |  | 34.50% | 12.00% |
| Ex 7c MB |  | 43.10% | 56.04% |  |  | 0.86% |  |  | 6.96% |
| Ex 7d MB |  | 43.29% | 56.28% |  |  | 0.43% |  |  | 6.93% |
| Ex 8a MB | 99.40% |  |  |  |  | 0.60% |  |  | 10.06% |
| Ex 8b MB |  |  | 65.00% |  |  | 1.20% |  | 33.80% | 5.00% |
| Ex 8c MB | 74.78% |  | 24.33% |  |  | 0.90% |  |  | 6.68% |
| Ex. 9 MB |  | 25.00% | 75.00% |  |  |  |  |  | 3.00% |

TABLE 1-continued

| Masterbatch samples used in examples and counter examples | | | | | | | | |
|---|---|---|---|---|---|---|---|---|
| | PPRO | PMP | TiO$_2$ | ZnS | PBlk 7 | PBlk 11 | PET | PETG | Dosage |
| also Ex 10 | | | | | | | | | |
| Ex. 10 MB | | | | | 0.50% | | | 99.50% | 4.00% |

For all samples, the additives were mixed at the feed throat of the extrusion step of a blow molding process on a Nissei ASB 50M blow molding machine. Bottles were blown with an axial orientation of 3.3× and a circumferential orientation of 3.3× for a total wall orientation of 10.9×$^2$. The final composition of each sample is shown in Table 2 below:

TABLE 2

| Final bottle compositions. | | | | | | | | |
|---|---|---|---|---|---|---|---|---|
| Name | PMP | TiO2 | PPRO | ZnS | PBlk 7 | PBlk 11 | SB 104 | PET |
| Ex 1a | 6.00% | | | | | | | 94.00% |
| Ex 1b | | 7.80% | | | | | | 92.20% |
| Ex 1c | 3.00% | 3.90% | | | | | | 93.10% |
| Ex 1d | 2.40% | 3.12% | | | | | | 94.48% |
| Ex 2a | | | 10.00% | | | | | 90.00% |
| Ex 2b | | 3.25% | | | | | | 96.75% |
| Ex 2c | | 1.63% | 5.00% | | | | | 93.38% |
| Ex 3 | 1.50% | 0.50% | | | | | | 98.00% |
| Ex 4 | 1.50% | 0.25% | | | | | | 98.25% |
| Ex 5 | 1.50% | | | | | | 0.60% | 97.90% |
| Ex 6 | 2.50% | | | 2.50% | | | | 95.00% |
| Ex 7a | 6.00% | | | | | 0.06% | | 93.94% |
| Ex 7b | | 7.80% | | | | 0.06% | | 92.14% |
| Ex 7c | 3.00% | 3.90% | | | | 0.06% | | 93.04% |
| Ex 7d | 3.00% | 3.90% | | | | 0.03% | | 93.07% |
| Ex 8a | | | 10.00% | | | 0.06% | | 89.94% |
| Ex 8b | | 3.25% | | | | 0.06% | | 96.69% |
| Ex 8c | | 1.63% | 5.00% | | | 0.06% | | 93.32% |
| Ex 9 | 0.750% | 2.25% | | | | | | 97.00% |
| Ex 10 | 0.750% | 2.25% | | | 0.02% | | | 96.98% |

The above referenced compositions were then subjected to orientation forces and their appearance properties were measured. The results of the measurements are shown in Table 3 below:

TABLE 3

| Measured appearance properties | | | | | | | | |
|---|---|---|---|---|---|---|---|---|
| Example | Light Barrier | Gonio-appearance | Goniochromatic Non pearlescent | Optical Density | L* | a* | b* | PMP to Pigment |
| Ex 1a | 96.2% | 26.8 | No | 1.24 | 96.9 | 0.0 | −0.1 | N/A |
| Ex 1b | 96.3% | 3.7 | Yes | 1.25 | 97.1 | −0.7 | 0.8 | 0:1 |
| Ex 1c | 98.2% | 4.0 | Yes | 1.52 | 97.7 | −0.6 | 1.1 | 0.77:1 |
| Ex 1d | 96.7% | 4.2 | Yes | 1.20 | 97.6 | −0.5 | 0.7 | 0.77:1 |
| Ex 2a | 90.5% | 27.8 | No | 0.88 | 96.1 | 0.0 | 0.1 | N/A |
| Ex 2b | 90.1% | 2.5 | Yes | 0.82 | 96.2 | −0.8 | 0.8 | N/A |
| Ex 2c | 88.5% | 4.9 | Yes | 0.75 | 96.2 | −0.6 | 0.7 | N/A |
| Ex 3 | 91.0% | 9.7 | Yes | 0.80 | 97.2 | −0.3 | 0.1 | 3:1 |
| Ex 4 | 90.6% | 15.1 | No | 0.79 | 96.4 | −0.4 | 0.3 | 6.07:1 |
| Ex 5 | 99.9% | 32.0 | No | 3.47 | 50.9 | −7.2 | −36.5 | 1.25:1 |
| Ex 6 | 96.5% | 5.9 | Yes | 1.17 | 97.1 | −0.4 | 0.4 | 1:1 |
| Ex 7a | 100.0% | 29.9 | No | 3.44 | 85.7 | 0.5 | 1.2 | 100:1 |
| Ex 7b | 99.7% | 4.5 | Yes | 2.95 | 87.2 | −0.8 | −1.6 | 0:1 |
| Ex 7c | 100.0% | 5.4 | Yes | 5.93 | 86.6 | −0.2 | −0.5 | 0.76:1 |
| Ex 7d | 99.9% | 4.6 | Yes | 3.00 | 91.3 | −0.1 | 0.5 | 0.76:1 |
| Ex 8a | 98.6% | 29.3 | No | 1.73 | 83.9 | 0.6 | 0.7 | N/A |
| Ex 8b | 99.0% | 4.0 | Yes | 2.08 | 81.6 | −0.8 | −2.1 | N/A |
| Ex 8c | 99.2% | 7.2 | Yes | 2.07 | 80.9 | 0.2 | −0.3 | N/A |
| Ex 9 | 91.5% | 2.9 | Yes | 1.13 | 96.1 | 0.2 | −0.3 | 1:3 |
| Ex 10 | 100.0% | 5.9 | Yes | 3.80 | 69.0 | −0.5 | −1.6 | 1:3 |

Examples 1a, 1b, 1c, 1d

Ex 1a, 1b, 1c, and 1d show that there is synergy when an oriented package wall combines PMP and a light scattering pigment. Ex 1a, using just PMP has a gonioapparent appearance and light barrier of 96.2%. Ex 1b, using just a light scattering pigment, requires a very high level of masterbatch to achieve the same light barrier of 96.3%. By using half of the light barrier contribution from Ex 1a and Ex 1b, one skilled in the art would anticipate the same light barrier performance. However, Ex 1c shows that the light barrier is improved while maintaining a goniochromatic appearance. Ex 1d further illustrated the synergy by reducing the total amount of both PMP and the light scattering pigment by 20% while still matching the light barrier of Ex 1a and Ex 1b and maintaining a goniochromatic appearance.

Counter Examples 2a, 2b, 2c

Ex 2a, Ex 2b, and Ex 2c show that there is no synergy when an oriented package wall combines a different olefin polymer and a light scattering pigment. Ex 2a, using PPRO, requires a very high loading level and still cannot achieve light barrier similar to Ex 1. Ex 2b, using just a light scattering pigment, matched the light barrier of Ex 2a. By using half of the light barrier contribution from Ex 1a and Ex 1b, one skilled in the art would anticipate the same light barrier performance. However, Ex 2c shows the light barrier is slightly worse than Ex 2a and Ex 2b.

Example 3 and Counter Example 4

Example 3 and Counterexample 4 show that at a ratio of PMP to light scattering pigment of about 3:1 results in an appearance that is goniochromatic and maintains color across a range of viewing angles. However, increasing that PMP to light scattering pigment up to about 6:1 results in an appearance that is gonioapparent and no longer maintains color across a range of viewing angles.

Counter Example 5

Counter Example 5 shows that using a non-light scattering pigment, does not provide a goniochromatic appearance. The added colorant must be a light scattering pigment, not an absorbing dye.

Example 6

Example 6 shows that other light scattering pigments can be used, in the case of Ex 6, CI Pigment white 7, zinc sulfide.

Examples 7a Through 7d

Ex 7a, 7b, and 7c show Ex 7a, 7b and 7c use the same structural polymer, PMP and light scattering pigment as Ex 1a, Ex 1b, and Ex 1c but with the addition of 0.060% PBlk 11 in the final composition. Because the light barrier is so high, the synergy in light barrier is measured using optical density. Ex 7d shows that, due to the synergy between PMP and $TiO_2$, the same light barrier can be achieved but with a reduced amount of PBlk 11, yielding a higher L* and brighter white while maintaining a goniochromatic appearance.

Counter Examples 8a Through 8c

Ex 8a, Ex 8b, and Ex 8c use the same structural polymer, PPRO, and light scattering pigment as Ex 2a, Ex 2b and Ex 2c but with the addition of 0.060% PBlk 11 in the final composition. Since there is no synergy between PPRO and TiO2, the L* appearance of Ex 7c is lower than Ex 8a and of Ex 8b.

Examples 9 and 10

Ex 9 and 10 show that there is synergy when an oriented package wall combines PMP and a light scattering pigment. Ex 9, using PMP and TiO2 has a gonioapparent appearance and light barrier of 91.5%. Ex 10, uses PMP, $TiO_2$, and carbon black (PBlk 7) and also has a gonioapparent appearance and blocks all light.

Although illustrated and described above with reference to certain specific embodiments the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. It is also expressly intended that the steps of the methods of using the various compositions disclosed above are not restricted to any particular order.

What is claimed is:

1. A method of producing an article, the method comprising:
   obtaining a composition comprising a mixture of polyethylene terephthalate (PET), polymethylpentene (PMP), and light scattering pigment selected from titanium dioxide and zinc sulfide; wherein the mixture comprises about 0.2 wt % to about 3.0 wt % PMP and about 0.2 wt % to about 4.0 wt % light scattering pigment, based on the total weight percent of the mixture; and the weight ratio of PMP to light scattering pigment is from about 3:1 to about 1:3; and
   subjecting the composition to an orientation stress to produce the article,
   wherein a wall of the article has a gonioappearance of less than 10 units, measured with a multi-angle spectrophotometer as CIELAB $DE_{CMC}$ with a 45° incident light source between 15° near-specular reflection and 110° far specular reflection.

2. The method of claim 1, wherein the orientation stress is selected from: blow molding, uniaxial or biaxial sheet orientation, thermoforming, and fiber spinning.

3. The method of claim 1, wherein the article is a packaging article.

4. The method of claim 1, wherein the article is selected from a preform, a tray, a container, and a film.

5. The method of claim 1, wherein the light scattering pigment is titanium dioxide.

6. The method of claim 1, wherein the composition further comprises a second pigment or colorant.

7. The method of claim 6, wherein the second pigment comprises a dye, a thermochromic pigment, a fluorescent pigment, a pearlescent pigment, a metallic pigment, or a combination thereof.

8. The method of claim 1, wherein the light scattering pigment is zinc sulfide.

* * * * *